United States Patent
Price

[15] 3,671,615
[45] June 20, 1972

[54] METHOD OF MAKING A COMPOSITE BOARD PRODUCT FROM SCRAP MATERIALS

[72] Inventor: Herbert K. Price, Richmond, Va.
[73] Assignee: Reynolds Metals Company, Richmond, Va.
[22] Filed: Nov. 10, 1970
[21] Appl. No.: 88,275

[52] U.S. Cl. ................................264/39, 264/115, 264/122
[51] Int. Cl. ..........................................D21b 1/07
[58] Field of Search ................156/62.2, 242, 306; 264/109, 264/115, 116, 123, 125, 140, 39

[56] References Cited

UNITED STATES PATENTS

| | | | |
|---|---|---|---|
| 2,222,633 | 11/1940 | Sheesley | 156/377 |
| 2,740,990 | 4/1956 | Miller et al. | 264/109 |
| 3,286,006 | 11/1966 | Annand | 264/109 |
| 3,309,444 | 3/1967 | Schyeler | 269/109 |
| 3,389,203 | 6/1968 | Merges et al. | 264/140 |

*Primary Examiner*—Robert F. Burnett
*Assistant Examiner*—Linda Koeckert
*Attorney*—Glenn, Palmer, Lyne, Gibbs & Thompson

[57] ABSTRACT

A method of making a composite board product from scrap materials such as are customarily available from a printing plant. The scrap materials are derived from three types of materials designated herein as plastic materials, fibrous materials and filler materials. The scrap materials are shredded or pulverized into small particles after which particles of a specified size are separated, filtered or culled out for further processing. The separated particles of the required size are homogenized in a mixing step and then placed in a preheated mold. Here the particles are subjected to unusually low pressure and temperature while formed into a finished product with the aid of a platen press. Typical finished products are employed as floor tiles, counter tops, wall panels or insulation.

11 Claims, 1 Drawing Figure

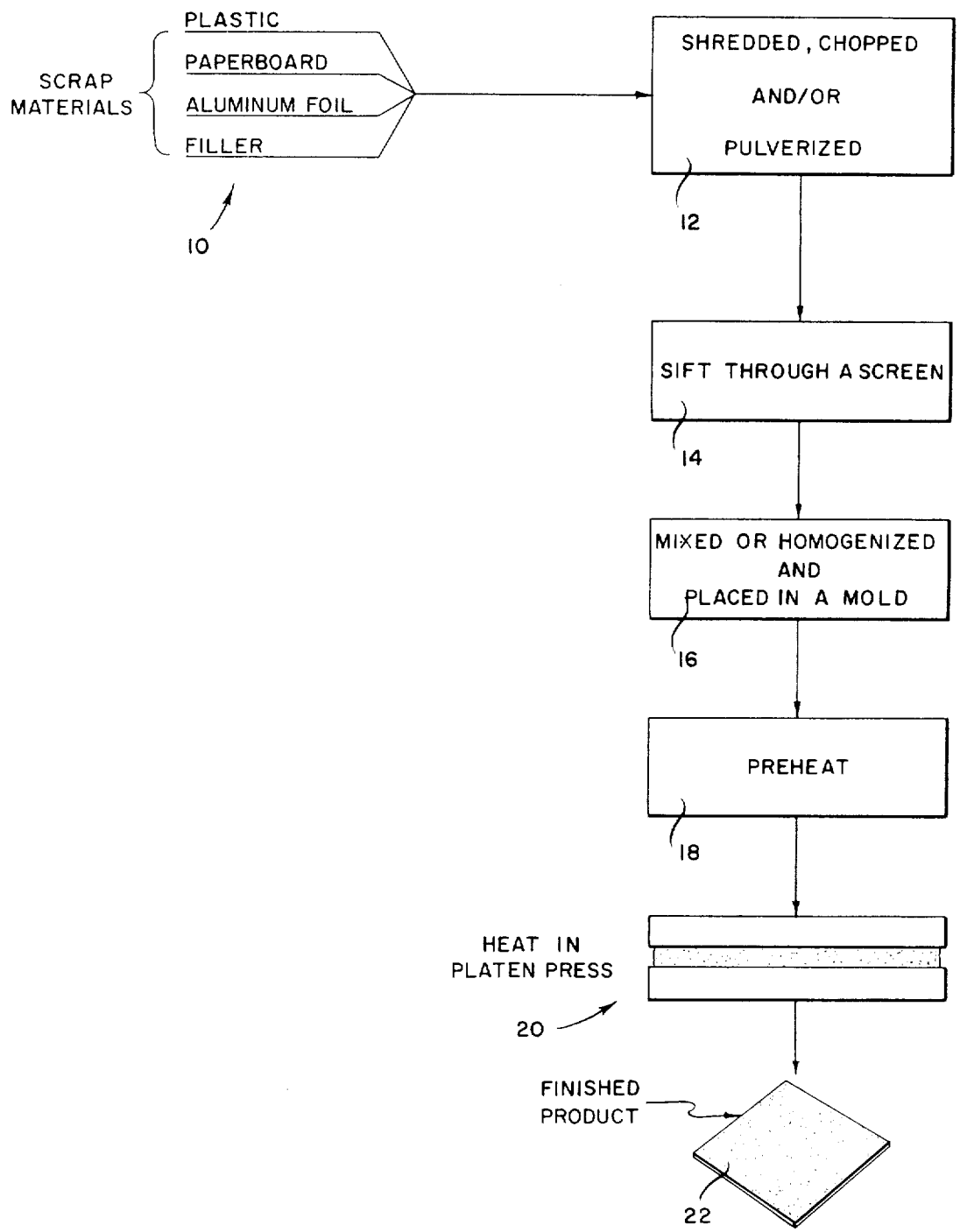

METHOD OF MAKING A COMPOSITE BOARD PRODUCT FROM SCRAP MATERIALS

This invention relates to a method of making a composite board product from scrap materials, and more particularly, to such a method employing scrap materials which are ordinarily available from a printing plant.

Heretofore it has been known to make composite board products by subjecting scrap materials to very high temperatures and pressures for relatively long periods of time. For example, temperatures of 400° F. at pressures of 1,200 psi for a period of time of 60 minutes are not uncommon.

The present invention produces a useful board product but requires much less expensive equipment for its manufacture and produces the desired compressed board product in much less time. Moreover, the present invention facilitates the use of waste materials which are both impure and highly variant in nature.

In the process of the present invention, a homogenized mixture of pulverized scrap materials which includes paper, paperboard, plastic and filler material are compressed under heat and pressure to form a composite board. The unexpectedness of the invention is that under relatively low heat and pressure the fibrous component of the paper and paperboard is saturated and encapsulated with the plastic to produce a composite board which has both high solvent and wear-resistant properties. The compressed boards are suitable for use as floor tiles, counter tops, wall panels, insulation and the like.

The scrap materials utilized by the present invention are normally those generated by the manufacture of flexible packaging materials. These materials include such items as paper, paperboard, plastic, metalfoil, ink pigments, plasticizers, wax, cloth, rags, sawdust, wood shavings and the like.

In order to practice the present invention, it is necessary to obtain a homogenized mixture of the selected scrap materials which have a rather specific particle size. The scrap materials may broadly be characterized as being selected from one of the following three groups:

1. fibrous materials which includes paper, paperboard, cloth and rags,
2. plastic materials which includes thermoplastic resins and polymeric substances,
3. filler materials which include metallic foils, ink pigments, plasticizers, wax and the like.

DEFINITIONS

For purposes of this invention, the term "paper" is intended to mean manufactured fibrous sheet having a thickness up to about 0.008 inches. Typical examples are bond, glassine, Kraft, newsprint, bending news, and the like. The paper may be colored, uncolored, printed, bleached, unbleached or coated. The paper may be made from reclaimed or from virgin fiber. Furthermore, the paper may be combined with other material such as aluminum foil in the form of a paper-foil laminate.

For purposes of this invention, the term "paperboard" is intended to mean a manufactured fibrous sheet having a thickness in the range of from about 0.0008 inches to about 0.03 inches. Paperboard can be colored, uncolored, printed, bleached, unbleached or coated. The paperboard may also be composed of reclaimed or virgin fibers. The paperboard may contain natural or synthetic fibers or it may be combined with other materials such as aluminum foil as a paperboard laminate.

The term "plastic" is intended to mean any resinous and polymeric substance which is thermoplastic in nature. Such substances include polyethylene, polypropylene, polyvinyl chloride, acrylic, polyester, polyamide, polysulfide, polycarbonate, ethylene-vinyl acetate, polyether, polystyrene and the like and combinations thereof.

The term "metallic foils" is intended to mean aluminum and tin foils having a thickness in the range from about 0.0002 inch to about 0.005 inch.

The term "waste pigments" is intended to mean colorants used in the manufacture of printing inks. These pigments include organic dyes, lakes of organic dyes, and inorganic pigments. Colorants of these types which are used in the printing of flexible packaging materials are extremely numerous and will not be enumerated herein. However, a ready reference of suitable waste pigments is contained in a book entitled "Color Index" which is prepared by the British Society of Dyers and Colorists and is published in the United States by the American Association of Textile Chemists and Colorists.

The term "plasticizers" is intended to mean organic phthalates, phosphates, adipates, azelates, glycollates and the like. Typical examples comprise dioctyl phthalate, butyl benzyl phthalate, octyl diphenyl phosphate, cresyl diphenyl phosphate, dioctyl adipate, di(n-octyl, n-decyl) adipate, di-n-hexyl azelate, di octyl azelate and methyl phthalyl ethyl glycollate.

The term "wax" is intended to mean mineral waxes such as paraffin wax and microcrystalline wax, petrolatum and Montan wax; vegetable waxes such as carnauba wax and candle wax; animal waxes such as beeswax, lanolin and tallow; or synthetic waxes such as carbowax, acrawax, chlorinated napthalenes, polyethylene wax and polyamide wax.

The means used to shred, cut or pulverize the scrap materials to prepare the mixture of waste materials may comprise a mechanical shredder or any other device which is suitable for this purpose. The shredder of the type most useful is a rotary shredder which chops the waste materials into small pieces. The size of these pieces is considered to be critical for purposes of this invention. These pieces should be chopped, shredded or pulverized to the extent that they will filter through a screen having a mesh in the range of from about one-tenth of an inch to about one sixty-fourth of an inch. Optimum results have been obtained using a screen having a one thirty-second of an inch mesh. It is also important that uniformity be obtained for the pulverized pieces. Thus it is necessary to mix the particles thoroughly to form a homogenized mixture after they have been separated into the required particle size. Normal mixing means such as a ribbon blender, an air mixer, or a rotary tumbler may be used.

The range variation for the plastic material is from about 40 percent to about 80 percent, by weight, of the entire mixture. The non-fibrous portion or filler materials are present from about 10 percent to about 40 percent, by weight, of the entire mixture. The heat used in the process is from about 210° F. to about 600° F. The dwell time for processing the materials is from a few seconds to about five minutes, with an optimum time being from about 30 seconds to about 90 seconds.

The pressure used in the process is unusually low. Thus a pressure range from about 40 psi to about 200 psi is used with an optimum pressure range of from about 80 psi to 100 psi. The pressure range is rather critical in that if too much pressure is used it will force the molten plastic out of the mixture and will result in incomplete saturation and encapsulation of fibrous material.

The inherent advantages and improvements of the present invention will become more readily apparent upon considering the following detailed description of the invention and by reference to the drawing in which:

The sole FIGURE is a block diagram illustrating steps taken in the practice of the present invention.

Referring to the sole figure, scrap materials 10 which are illustrated generally to include typical materials such as plastic, paperboard, aluminum foil and filler materials are selected. The materials are then reduced in size by being suitably shredded, chopped and/or pulverized or otherwise comminuted at 12. Thereafter, particles of a proper size are separated from the remainder of the particles by any suitable means such as by being sifted through a screen at 14. The materials are then mixed thoroughly in order to produce a homogenous mixture and placed in a mold 16 which is preheated as indicated at 18. The scrap materials are charged into a frame fitted into a platen indicated generally at 20. The platen is then brought into pressing position and the loose mixture held in position by the frame while opposing members of the platen, press the mixture into the shape of the frame. After the required heat and pressure have been exerted for the required time, the pressing position of the platen is then released. The platen is lifted and the composite board, indicated as the finished product 22, is removed from the frame.

The platen press can be any kind of press of the type which can apply the required heat and pressure. For best results, both platens which compress the loose mixture should be heated. In addition, the platens should be treated with a release agent such as silicon, petrolatum, wax, mineral oil and the like. A coating of polytetrafluoroethylene sold under the trademark Teflon by E.I. DuPont de Nemours & Company has been found to provide optimum results.

The amount of heat, pressure and time needed to effect the final result will, of course, depend upon the mixture being subjected to treatment. For example, where a higher melt index plastic is used, a higher temperature is required to obtain the necessary flow and results in fiber saturation and encapsulation. Where metallic materials, such as aluminum foil, are included in the composite mixture, a lower temperature is sometimes needed to effect this result. This is true because of the advantages in heat transfer brought about when metal is employed.

The following examples will serve to further illustrate the subject invention:

EXAMPLE I

A composite board was prepared by shredding, chopping and pulverizing the following materials, which were then filtered through a 1/32-inch screen and then mixed thoroughly using the following proportions, by weight, of scrap materials:

| | |
|---|---|
| Bond Paper—(printed) | 30% |
| Aluminum foil | 20% |
| Polyethylene resin | 50% |

These materials were placed within a mold in a platen press. The press was heated to a temperature of 300° F. and maintained at a pressure of 90 psi. The heat and pressure were continued for 1 minute and the compacted sheet was then removed from the press.

EXAMPLE II

A composite board was prepared by shredding the following materials, which were then filtered through a 1/32-inch screen and mixed thoroughly with the scrap materials being present on a weight basis in the following percentages:

| | |
|---|---|
| .01" Paperboard | 30% |
| Aluminum foil | 20% |
| Polyethylene resin | 25% |
| Polypropylene resin | 25% |

The materials were placed within a mold in a platen press which was heated to 300° F. at a pressure of 90 psi. The heat and pressure were maintained for 1 minute and the compacted sheet was then removed from the press.

EXAMPLE III

A composite board was prepared by shredding the following scrap materials which were then filtered through a 1/32-inch screen and mixed thoroughly so as to produce a homogenized mixture whose ingredients were present on a weight basis as follows:

| | |
|---|---|
| Printed Paperboard Carton Scrap | 25% |
| Polyvinyl Chloride resin | 75% |

The foregoing materials were then placed in a mold in a platen press which had been preheated to 450° F. and pressurized to 200 psi. The materials were maintained under that heat and pressure for 3 minutes in order to produce a fully compacted sheet.

EXAMPLE IV

Scrap materials were shredded, filtered through a 1/32-inch screen and then mixed thoroughly so as to produce a homogenized aggregate having the following proportions on a weight basis:

| | |
|---|---|
| Polyvinyl chloride resin | 65% |
| Paperboard Carton Scrap | 25% |
| Dioctyl phthalate | 10% |

The foregoing materials were placed in a mold in a platen press which had been preheated to 350° F. at 100 psi. The materials were held for a dwell time of 30 seconds in order to produce a composite board.

EXAMPLE V

Example IV was repeated, except that the following materials were employed as the scrap materials on a weight basis:

| | |
|---|---|
| Polyethylene resin | 60% |
| Carton Scrap | 30% |
| Aluminum Foil | 10% |

EXAMPLE VI

Scrap material was filtered through a 1/32-inch screen and thoroughly mixed in order to produce a homogenized aggregate having the following proportions on a weight basis:

| | |
|---|---|
| Bond paper—printed | 30% |
| Aluminum foil | 5% |
| Titanium dioxide pigment | 5% |
| Paraffin wax | 5% |
| Polyethylene resin | 55% |

These materials were then placed in a mold in a platen press which had been preheated at a pressure of 90 psi to 300° F. The heat and pressure were continued for 1 minute and the fully compacted sheet then removed from the press.

All of the compacted composite boards made in accordance with the preceding examples exhibited resistance to water beyond expectations. The exceptional resistance of the composite board products to moisture makes them superior to the current paper-adhesives laminated boards which are currently on the market. The composite boards also exhibited high solvent and wear-resistant properties.

Moreover, the present invention facilitates the conversion of printed or unprinted paper, foil-board, foil-paper and plastic scrap into a salable board which is useful in making floor tile, sheathing material for houses, shingles, counter tops, and the like.

While presently preferred embodiments of the invention have been illustrated and described, it will be recognized that the invention may be otherwise various embodied and practiced with the scope of the claims which follow.

What is claimed is:

1. A method of making a composite board product from scrap materials comprising the steps of
    A. shredding scrap materials into small particles,
        1. said scrap materials comprising:
            a. plastic materials constituting from about 40 percent to about 80 percent, by weight, of the scrap materials,
            b. fibrous materials constituting from about 20 percent to about 60 percent, by weight, of the scrap materials,
            c. filler materials constituting from about 10 percent to about 40 percent, by weight, of the scrap materials, B. separating out particles having a size between about one sixty-fourth inch and about one-tenth inch, C. mixing said separated particles in order to homogenize them, D. heating said homogenized particles at a temperature between about 210° F. and about 600° F. while applying pressure from about 40 psi to about 200 psi between platens of a forming press for a period of time from about a few seconds to about 5 minutes.

2. A method of making a composite board product from scrap materials as defined in claim 1 wherein said plastic materials are selected from the group consisting of polyethylene, polypropylene, polyvinyl chloride, acrylic, polyester, polyamide, polysulfide, polycarbonate, ethylene-vinyl acetate, polyether, polystyrene, and combinations thereof.

3. A method of making a composite board product from scrap materials as defined in claim 1 wherein said fibrous materials are selected from the group consisting of paper, paperboard, cloth and rags.

4. A method of making a composite board product from scrap materials as defined in claim 1 wherein said filler materials are selected from the group consisting of metallic foils, ink pigments, plasticizers, and wax.

5. A method of making a composite board product from scrap materials as defined in claim 1 wherein said separating step consists of filtering said separated particles through screens having a mesh in a range from about one-tenth inch to about one sixty-fourth inch.

6. A method of making a composite board product from scrap materials as defined in claim 5 wherein said screen has a mesh of about one thirty-second inch.

7. A method of making a composite board product from scrap materials as defined in claim 1 wherein said plastic materials are thermoplastic in nature.

8. A method of making a composite board product from scrap materials as defined in claim 7 wherein said plastic materials are selected from the group consisting of polyethylene, polypropylene, polyvinyl chloride, acrylic, polyester, polyamide, polysulfide, polycarbonate, ethylene-vinyl acetate, polyether, polystyrene and combinations thereof.

9. A method of making a composite board product from scrap materials as defined in claim 1 wherein said pressure range is limited to between about 80 psi and 100 psi.

10. A method of making a composite board product from scrap materials as defined in claim 1 wherein said homogenized particles are compressed between said platens of said forming press for a period of time from about 30 seconds to about 90 seconds.

11. A method of making a composite board product from scrap materials as defined in claim 1 including the additional step of coating said platents of said forming press with a release coating consisting of polytetrafluoroethylene.

* * * * *